(12) United States Patent
Jen

(10) Patent No.: US 7,961,253 B2
(45) Date of Patent: Jun. 14, 2011

(54) METHOD OF PROCESSING FIELDS OF IMAGES AND RELATED DEVICE FOR DATA LINES SIMILARITY DETECTION

(75) Inventor: Scott Jen, Hsin-Chu (TW)

(73) Assignee: MStar Semiconductor, Inc., ChuPei, Hsin-Chu Hsien (TW)

( * ) Notice: Subject to any disclaimer, the term of this patent is extended or adjusted under 35 U.S.C. 154(b) by 0 days.

(21) Appl. No.: 12/256,481

(22) Filed: Oct. 23, 2008

(65) Prior Publication Data

US 2009/0040375 A1  Feb. 12, 2009

Related U.S. Application Data

(63) Continuation of application No. 10/907,619, filed on Apr. 8, 2005, now abandoned.

(60) Provisional application No. 60/560,621, filed on Apr. 9, 2004.

(51) Int. Cl.
*H04N 7/01* (2006.01)
*H04N 11/20* (2006.01)
*H04N 9/74* (2006.01)

(52) U.S. Cl. .................... 348/448; 348/449; 348/580

(58) Field of Classification Search .................. 348/448, 348/449, 580
See application file for complete search history.

(56) References Cited

U.S. PATENT DOCUMENTS

| | | | | |
|---|---|---|---|---|
| 5,365,273 A * | 11/1994 | Correa et al. | ................. | 348/452 |
| 5,398,071 A * | 3/1995 | Gove et al. | ................. | 348/558 |
| 5,550,592 A * | 8/1996 | Markandey et al. | ................. | 348/448 |
| 5,642,239 A * | 6/1997 | Nagai | ................. | 360/8 |
| 5,689,301 A * | 11/1997 | Christopher et al. | ................. | 348/97 |
| 5,757,435 A * | 5/1998 | Wells | ................. | 348/441 |
| 5,828,786 A * | 10/1998 | Rao et al. | ................. | 382/236 |
| 5,892,550 A * | 4/1999 | Iwasaki et al. | ................. | 348/443 |
| 6,037,990 A * | 3/2000 | Ogawa et al. | ................. | 348/452 |
| 6,055,018 A * | 4/2000 | Swan | ................. | 348/448 |
| 6,262,773 B1 * | 7/2001 | Westerman | ................. | 348/448 |
| 6,366,699 B1 * | 4/2002 | Kuwano et al. | ................. | 382/199 |
| 6,509,933 B1 * | 1/2003 | Honda | ................. | 348/558 |
| 6,525,774 B1 * | 2/2003 | Sugihara | ................. | 348/459 |
| 6,542,199 B1 * | 4/2003 | Manbeck et al. | ................. | 348/459 |
| 6,545,727 B1 * | 4/2003 | Pau et al. | ................. | 348/700 |
| 6,559,890 B1 * | 5/2003 | Holland et al. | ................. | 348/441 |
| 6,563,550 B1 * | 5/2003 | Kahn et al. | ................. | 348/700 |
| 6,608,930 B1 * | 8/2003 | Agnihotri et al. | ................. | 382/176 |
| 6,621,927 B1 * | 9/2003 | Mori et al. | ................. | 382/173 |
| 6,839,094 B2 * | 1/2005 | Tang et al. | ................. | 348/607 |
| 6,842,537 B2 * | 1/2005 | Nicolas et al. | ................. | 382/199 |
| 6,870,568 B1 * | 3/2005 | Hui | ................. | 348/458 |
| 6,897,903 B1 * | 5/2005 | Hu | ................. | 348/700 |
| 7,064,790 B1 * | 6/2006 | Varma et al. | ................. | 348/441 |
| 7,075,581 B1 * | 7/2006 | Ozgen et al. | ................. | 348/448 |

(Continued)

*Primary Examiner* — Brian Yenke
(74) *Attorney, Agent, or Firm* — Winston Hsu; Scott Margo

(57) ABSTRACT

A display controller capable of detecting data line similarity is provided. The display controller includes a buffer for temporarily storing a plurality of data lines of a target field, a data line similarity detector, coupled to the buffer, for detecting a similarity of each data line of the target field, a data line state recorder for recording the similarity of each data line of the target field, a de-interlacer coupled to the buffer, and a scaler coupled to the de-interlacer, wherein the de-interlacer selectively de-interlaces the target field according to the content stored in the data line state recorder in order to generate a de-interlaced output, and the scaler generates a scaling output according to the de-interlaced output.

5 Claims, 14 Drawing Sheets

U.S. PATENT DOCUMENTS

| | | | |
|---|---|---|---|
| 7,113,544 B2 * | 9/2006 | Tanase et al. | 375/240.16 |
| 7,129,990 B2 * | 10/2006 | Wredenhagen et al. | 348/449 |
| 7,154,555 B2 * | 12/2006 | Conklin | 348/448 |
| 7,212,246 B2 * | 5/2007 | Jung et al | 348/448 |
| 7,233,361 B2 * | 6/2007 | Yang et al. | 348/441 |
| 7,239,353 B2 * | 7/2007 | Lee et al. | 348/441 |
| 7,262,818 B2 * | 8/2007 | Chuang et al. | 348/790 |
| 7,283,174 B2 * | 10/2007 | Tokuhara et al. | 348/448 |
| 7,307,670 B2 * | 12/2007 | Lu | 348/701 |
| 2002/0135697 A1 * | 9/2002 | Wredenhagen et al. | 348/448 |
| 2004/0189877 A1 * | 9/2004 | Choi et al. | 348/700 |
| 2004/0233326 A1 * | 11/2004 | Yoo et al. | 348/452 |
| 2004/0257476 A1 * | 12/2004 | Song et al. | 348/700 |
| 2005/0206785 A1 * | 9/2005 | Swan et al. | 348/448 |
| 2005/0253964 A1 * | 11/2005 | Janssen et al. | 348/459 |
| 2006/0072037 A1 * | 4/2006 | Wyman | 348/448 |

* cited by examiner

METHOD OF PROCESSING FIELDS OF IMAGES AND RELATED DEVICE FOR DATA LINES SIMILARITY DETECTION

CROSS REFERENCE TO RELATED APPLICATIONS

The application claims the benefit of U.S. patent application Ser. No. 10/907,619, which was filed on Apr. 8, 2005, and which in turn claims the benefit of U.S. Provisional Application No. 60/560,621 which was filed on Apr. 9, 2004.

BACKGROUND OF THE INVENTION

1. Field of the Invention

The invention relates to a method for generating TV signals and related apparatus, and more particularly, to a method for generating TV signals according to data lines similarities and related apparatus thereof.

2. Description of the Prior Art

The continuous and dynamic images of movies and television provided to viewers are in reality generated from a combination of gradually changing still images. When the television displays the video, there are two types of systems that have evolved to produce the continuous and dynamic flow of images. The first one is the national television standard committee (NTSC) system. In this system each video field includes 525 rows of data (i.e., 525 horizontal lines) and 60 pictures are displayed each second, i.e. the field rate is 60 Hz. The second system is called the phase alternating line (PAL), wherein each video field includes 625 rows of data and 50 pictures are displayed each second, i.e. the field rate is 50 Hz. For these two traditional television systems, to display 60 fields per second comprising 525 rows of data or to display 50 fields per second comprising 625 rows of data is extremely expensive, thus not suitable to the market. So, interlaced scanning technology was developed. Interlaced scanning scans the even lines for the first video field, then scans the odd lines for the next video field instead of scanning all lines for each field. Hence, for NTSC system with 60 Hz field rate actually 30 frames per second are processed, and for PAL system actually 25 frames per second are processed. However, the flow of dynamic images is still acceptable to the human eye. The images are still perceived as continuous and dynamic. Each frame in the interlaced scanning technology is divided into two parts: odd sequence data that is known as odd field and even sequence data that is known as even field.

However, a movie is displayed at a frame rate of 24 Hz. For NTSC system, as an example, when it is desirable to broadcast the movie to the television the movie's image data must be converted from its normal frequency of 24 Hz to 60 Hz.

Please refer to FIG. 1, which shows a comparison of the original film frames and interlaced TV fields. The upper part of FIG. 1 shows the original film frames A, B, C, and D, and the lower part of FIG. 1 shows 10 interlaced TV fields F1-F10 generated from the original film frames A, B, C, and D. For example, the odd lines of the film frame A associates with the TV fields F1 and F3. Furthermore, the even lines of the film frame A associates with the TV field F2, wherein $A_o$ and $A_e$ represent the odd field and the even field generated from the film frame A, respectively. Similarly, Be and Bo represent the even field and odd field from the film frame B. Ce and Co represent the even field and odd field from the film frame C. De and Do represent the even field and odd field from the film frame D. So, the frame rate of the film is 24 Hz, but the field rate of the NTSC system is 60 Hz. In other words, two film frames are transformed into five TV fields, so-called three to two pull down conversion, to comply with the NTSC system. Therefore, the total data amount is halved and the odd and even fields are displayed in the interlaced way.

Progressive scan is developed later and becomes popular, such as the LCD display or plasma TV. In progressive scan, the whole data lines, instead of only half data lines, of each video field are displayed. Therefore, when the progressive scan (or the double-frequency TV image technique) is utilized to display the field, which only comprise half data, fields should be transformed into frames, which comprise the whole data, so that the progressive scan can be executed correctly. The above-mentioned operation of transforming fields into frames is also called as "de-interlacing" technique. Generally speaking, two odd (even) fields corresponding to the same film frame are the same, but two odd (even) fields corresponding to two film frames are the same only if the two film frames are still. In the prior art, one field can be deinterlaced with the adjacent field to double the display resolution. However, if the original field data are the fields of film data as shown in FIG. 1, a serious problem occurs when the third field Ao and the fourth field Be are combined because the field Ao and the field Be correspond to different frames. Therefore, if the interlaced TV fields come from the film data, only the first pair of odd (even) fields is the same per five odd (even) fields.

Please refer to FIG. 2, which is a diagram of generating progressive TV frames. When we find that the fields F1 and F3 are the same and the fields F6 and F8 are the same, the source image data can be determined to be a film image. Therefore, the odd field F1 and the even field F2 can be combined as a progressive TV frame P1, which is labeled as A'. Similarly, the progressive TV frame P4, P6, and P9 are respectively labeled as B', C', and D'.

In the NTSC system, the frame rate of the progressive scan technique is 60 Hz. Therefore, the progressive TV frame P1 is utilized to generate the progressive TV frames P2 and P3. In other words, the progressive TV frame A' is displayed in total three times. Similarly, the progressive TV frames P4 are copied to generate the progressive TV frame P5. That is, the progressive TV frame B' is displayed twice. Similarly, the frame C' is displayed three times, and the frame D' is displayed twice.

When the TV data are broadcasted by the TV service provider, other data or information (for example, running text) is added to facilitate advertisements or news. Because of the introducing this additional data or information, two same fields looks different. If two same fields originates from the same film frame, the prior art may wrongly determine the mode of the TV content or wrongly processing the fields results in the running text becoming blurred.

In addition to adding the running text, other information can be added such that the original similarity pattern is influenced. For example, a still text or trademark is added, or the current time text can be added in the corner of the picture. These may cause a misinterpretation of the type of the source image. Please refer to FIG. 3, which shows a TV field sequence comprising still texts during a time period. As shown in FIG. 3, the fields F11-F20 are generated from film frames E, F, G, and H. The TV service provider adds a still text (e.g., a trademark of the TV service provider) in the fields F12-F17. Therefore, interlaced TV fields F11-F20 can be orderly shown as Eo, Ee', Eo', Fe', Fo', Ge', Go', Ge', Ho, He, wherein the label' represents that the field comprises the above-mentioned still text. Most TV service providers do not notice the 3:2 pull-down ratio relationships between the film frames and the interlaced TV fields while adding additional text, A sudden text shadow between the successive even and odd fields on TV screen may occur (e.g., between the fields Eo and Ee' and between the fields Go and Ge', where the still text is only added in one field of two successive fields). This cause the wrong determination of the mode of the TV content. If the fields are processed, the added texted area of the image becomes blurred. Alternatively, if we do nothing, the image quality becomes poor.

SUMMARY OF THE INVENTION

It is therefore one of primary objectives of the claimed invention to provide a method for generating a TV signal according to data line similarity and the related apparatus thereof. That is, the present invention utilizes the data line as a unit to detect the similarity of each pair of fields, and then utilizes the similarity pattern to determine the type of the source image. Therefore, the present invention utilizes the data line as a unit to process the interlaced TV data to generate the progressive TV data in order to prevent the influence of the similarity pattern from having a negative effect on the added running texts or still texts in order to solve the above-mentioned problem.

According to an exemplary embodiment of the claimed invention, a display controller capable of detecting data line similarity is disclosed. The display controller includes a buffer for temporarily storing a plurality of data lines of a target field, a data line similarity detector, coupled to the buffer, for detecting a similarity of each data line of the target field, a data line state recorder for recording the similarity of each data line of the target field, a de-interlacer coupled to the buffer, and a scaler coupled to the de-interlacer, wherein the de-interlacer selectively de-interlaces the target field according to the content stored in the data line state recorder in order to generate a de-interlaced output, and the scaler generates a scaling output according to the de-interlaced output.

These and other objectives of the present invention will no doubt become obvious to those of ordinary skill in the art after reading the following detailed description of the preferred embodiment that is illustrated in the various figures and drawings.

DETAILED DESCRIPTION

The present invention utilizes data lines as a unit (line-based) to detect similarities of specific data lines of each field in an interlaced TV signal. If the similarities of the specific data lines comply with a predetermined similarity pattern, the present invention combines data of the specific data lines of two successive fields to generate a progressive TV signal. On the other hand, if the similarities of the specific data lines do not comply with the predetermined similarity pattern, the present invention directly interpolates the data lines utilizing the current field, to enhance the quality for the progressive TV signal.

Figure 1:
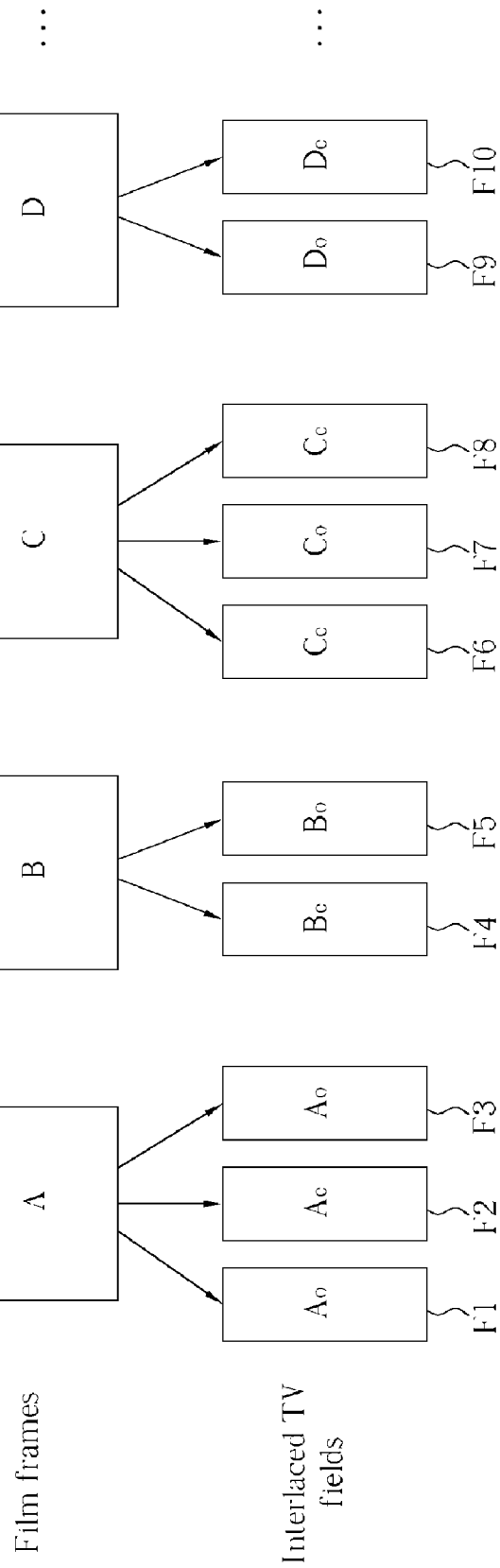
FIG. 1 is a diagram of comparisons of TV fields and original film frames according to the prior art.
Figure 2:
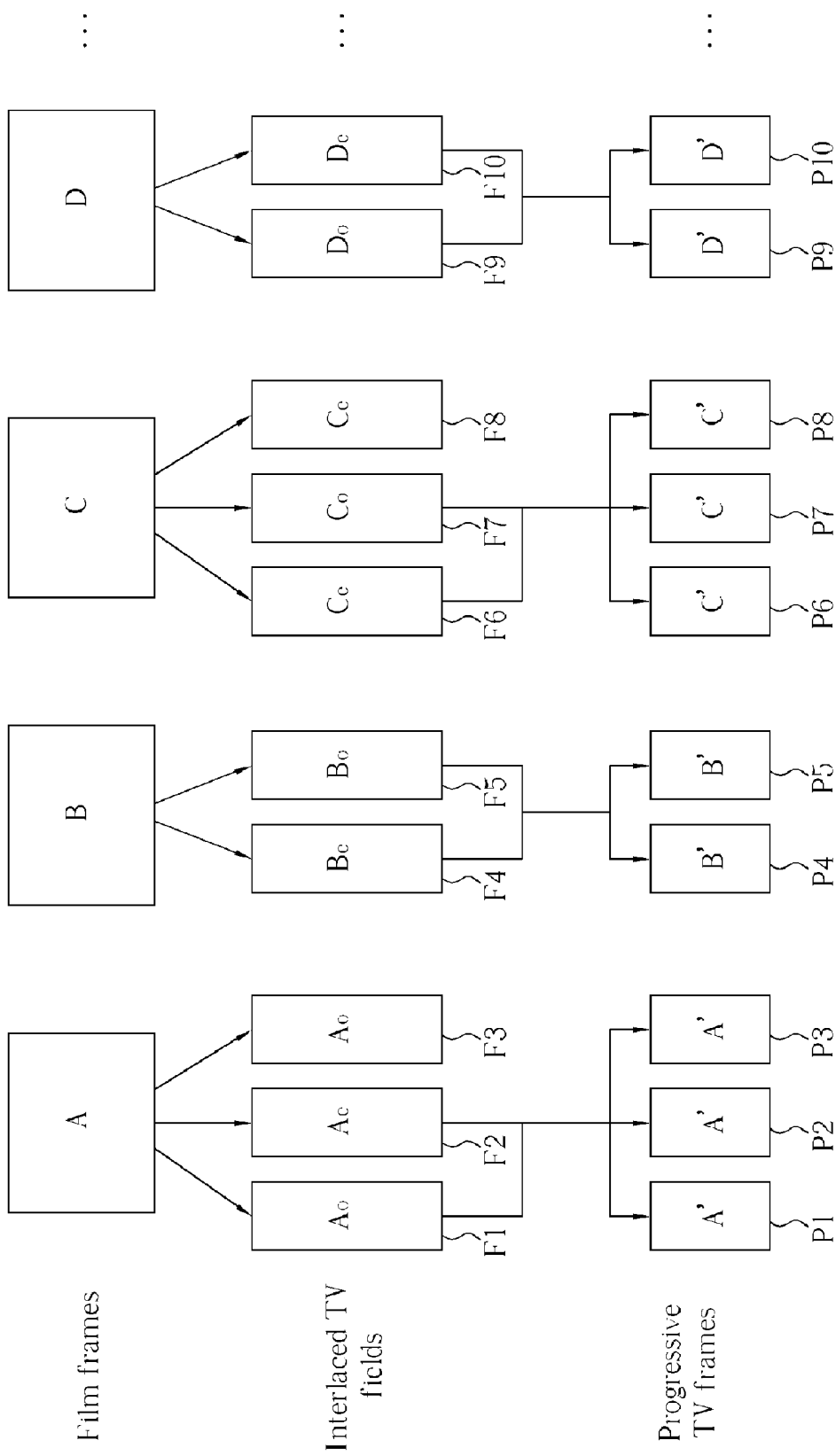
FIG. 2 is a diagram of generating progressive TV frames according to the prior art.
Figure 3:
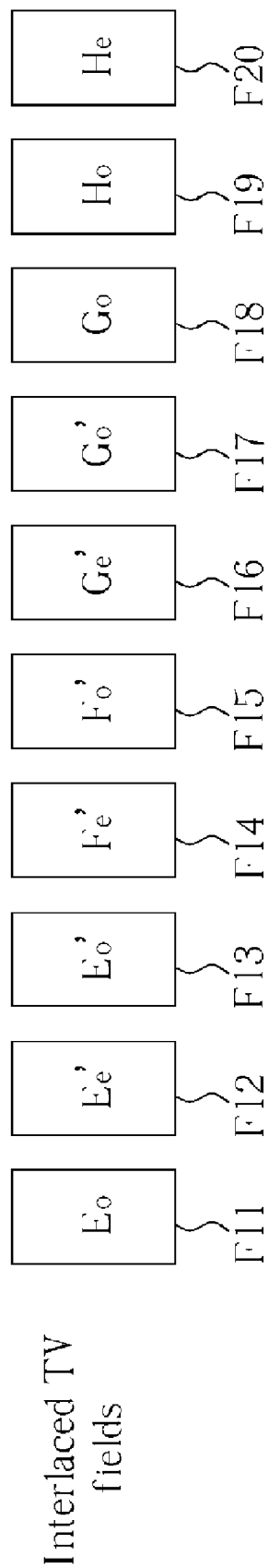
FIG. 3 is a diagram of TV fields that have still texts added in a time period according to the prior art.
Figure 4:
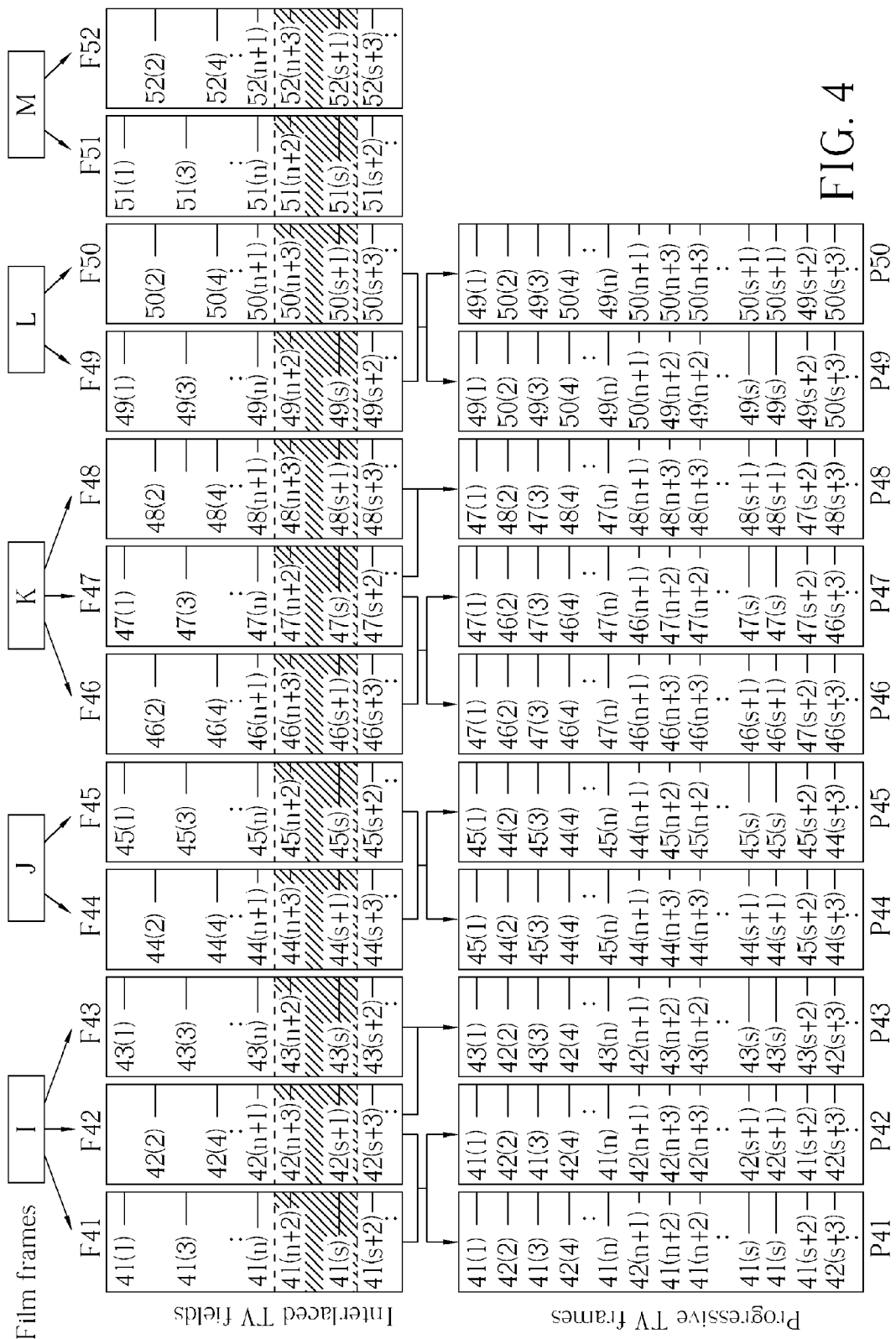
FIG. 4 shows interlaced TV fields F41-F52 comprising running texts according to the present invention.

Please refer to FIG. 4, which shows interlaced TV fields F41-F52 comprising running texts and shows the relationship between the film frames I-M and the interlaced fields F41-F52. The TV service provider adds a running text between the n+2 data line and the s+1 data line. Please note the range of the running text in odd and even fields is differed by one data line. For example, the fields F41 and F43 originate from the odd lines of the film frame, and the running text (this is shown as slope lines in FIG. 4) is added between the n+2 data line and the s data line. The odd field F51 and the even field F52 originate from the film frame M. The $y^{th}$ line of the field X is labeled as X(y). In this embodiment, two fields, which have a field between them (for example, the fields F41 and F43), are regarded as a pair of corresponding fields. Furthermore, a data line is utilized as a unit to respectively detect the similarities of corresponding data lines of the pair of corresponding fields. And then, the similarities of the data lines are compared with a specific pattern. For example, the first data line of the field F41 is compared with the first data line of the field, the second data line of the field F42 is compared with the second data line of the field F44. It is known that if the pair of corresponding fields both originate from the same film frame and are odd (even) fields, the pair of corresponding fields is quite similar. Therefore, if the pixels' difference between the pair of corresponding fields is less than a predetermined number, the pair of corresponding fields is determined as being similar. As mentioned above, it can be seen that the first data line of the field F41 and the first data line of the field F43 are similar, and the second data line of the field F46 and the second data line of the field F48 are similar. Therefore, the present invention determines that the interlaced TV fields comply with a specific similarity pattern because of the above-mentioned characteristic. And the present invention can know that the first lines and the second lines of the above-mentioned TV fields come from the film frames. As shown in FIG. 4, for example, the first data line of the interlaced TV field F41 and the second data line of the interlaced TV field F42 can be deinterlaced to generate the first and the second data lines of the progressive TV frames P41 and P42. Similarly, when comparing the third data line and the fourth data line of the pair of the corresponding fields among the fields F41-F52, the present invention detects that the third data lines of the fields F41 and F43 are similar and the fourth data lines of the field F46 and the field F48 are similar. Therefore, the present invention can determine that the third and fourth data lines of the TV fields also come from the film frames. Therefore, the present invention can utilize the third data lines and the fourth data lines to generate the third and fourth data lines of wanted frames. For example, the present invention can utilize the fourth data line of the field F44 and the third data line of the field F45 to generate the third and fourth data lines of the progressive TV frames P44 and P45.

In this embodiment, the present invention can detect a similarity pattern of data lines of the interlaced scanning television image signal in the data lines, which are above the n+2 data line or below the s data line in odd fields among the fields F41 to F50, and in the data lines, which are above the n+3 data line or below the s+1 data line in even fields among the fields F41 to F50. The similarity, as mentioned above, indicates that the two fields of the first pair of fields among five successive pairs of fields are similar to each other, wherein each pair of fields contains two fields that are separated by a single field. And if the similarity complies with the similarity pattern, the data line is utilized as a unit to combine the odd field and the even field to generate corresponding data lines of TV frames P41-P50. This allows that the data of the 1 data line to n+1 data line, and data of the data lines below the s+2 data lines are double of the original interlaced TV field so as to have better display quality.

However, because the running text is added in the interlaced TV fields F41-F50, the similarities of the n+2 data lines of the fields F41-F50 to s+1 data lines of the fields F41-F50 do not comply with the specific similarity pattern. Therefore, the present invention directly utilizes neighboring data lines of the current field to generate two data lines of the progressive frames.

As shown in FIG. 4, the data lines of interlaced TV field F41 are utilized to generate the odd lines of the first data line to n data line of the frame P41. And the data lines of interlaced TV field are utilized to generate the even lines of the second data line to the n+1 data lines of the frame P41. The data of n+2 data line to the s data line of the interlaced TV field F41 are utilized to generate the data lines from the n+2 data lines to s+1 data lines (each data line of the n+2 data line to the s+1 data line) of the frame P41 (for example, the data lines of the field F41 can be interlaced themselves or repeatedly outputted to generate corresponding data lines of the frame) because the similarity does not comply with the specific pattern. For example, the n+2 data line of the field F41 is utilized as the n+2 data line and the n+3 data line of the frame P41. From the s+2 data line, because there is no running text added, these data lines of the interlaced TV fields have the similarity pattern of the film frame again, so the field F41 and the field F42 are deinterlaced to generate the data lines of the frame P41 therebetween.

In this embodiment, if detecting that the similarities of corresponding data lines of fields comply with the specific similarity pattern for several times (for example, the specific similarity pattern of the data lines of the pair of corresponding fields per five fields appears twice), the present invention combines the data of the data lines of the interlaced TV fields into the corresponding data lines of the progressive TV frames according to a predetermined way. Please note that when the data are displayed, if the similarity pattern cannot be detected, the present invention directly utilizes the data lines of the fields to generate progressive TV data instead of utilizing the combined data line.

Figure 5:
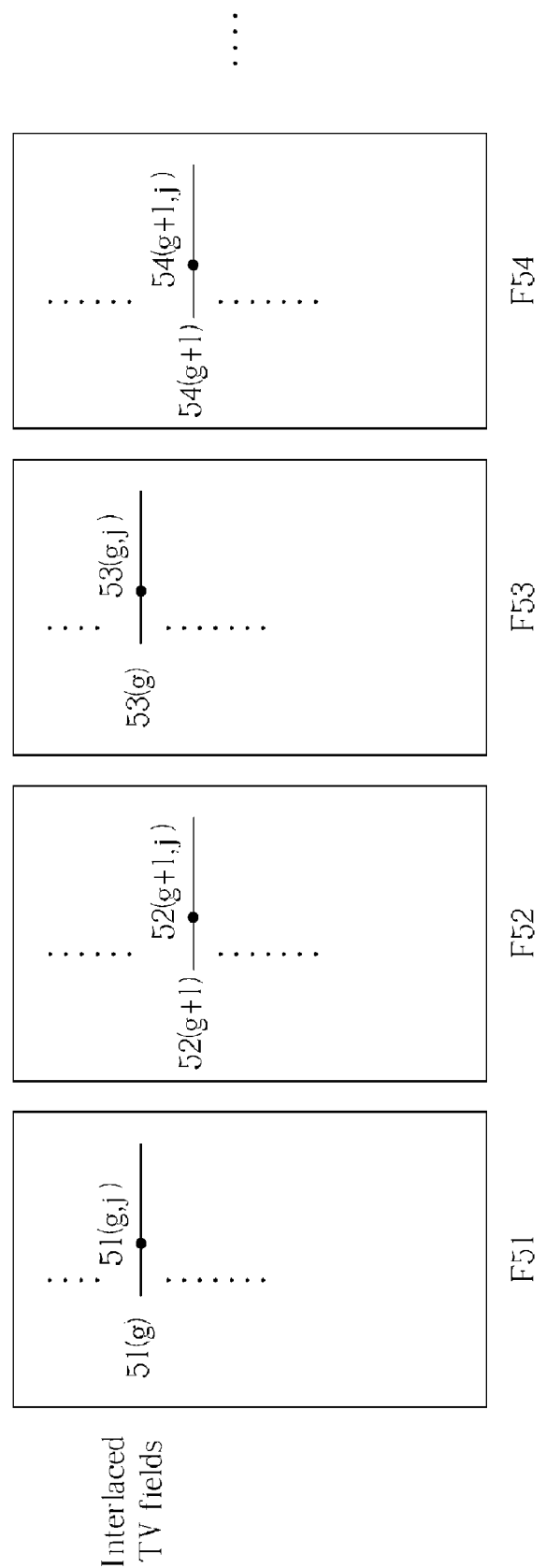
FIG. 5 is a diagram of an interlaced TV field sequence according to the present invention.

Please refer to FIG. 5, which is a diagram of an interlaced TV field sequence. As shown in FIG. 5, the $z^{th}$ pixel of the $y^{th}$ of the X data line is labeled as X(y,z). In this embodiment, the gray level value of pixels of two corresponding lines of a pair of corresponding fields are compared, and the comparison results are utilized to determine whether the two data lines are similar. For example, if the pixel 51($g, j$), j pixel of g data line of the field F51, is a target pixel, the pixel 53($g, j$) is compared with the pixel 51($g, j$). In addition, if the gray value of the pixel 51($g, j$) is different from the gray value of the pixel 53($g, j$) or the difference between the gray values of the pixels 51($g, j$) and 53($g, j$) is larger than a predetermined value K1 (considering the noise), the pixel 51($g, j$) is regarded as being different from the corresponding pixel 53($g, j$). Furthermore, if the number of pixels, which are detected as being different from corresponding pixels, of the g data line of the field F51 is less than a predetermined number K2, the present invention determines that the g data line of the field F51 is similar to the g data line of the field F53. Conversely, if the number of pixels, which are detected as being different from corresponding pixels, of the g data line of the field F51 is larger than a predetermined number K2, the present invention determines that the g data line of the field F51 is not similar to the g data line of the field F53.

Figure 6:
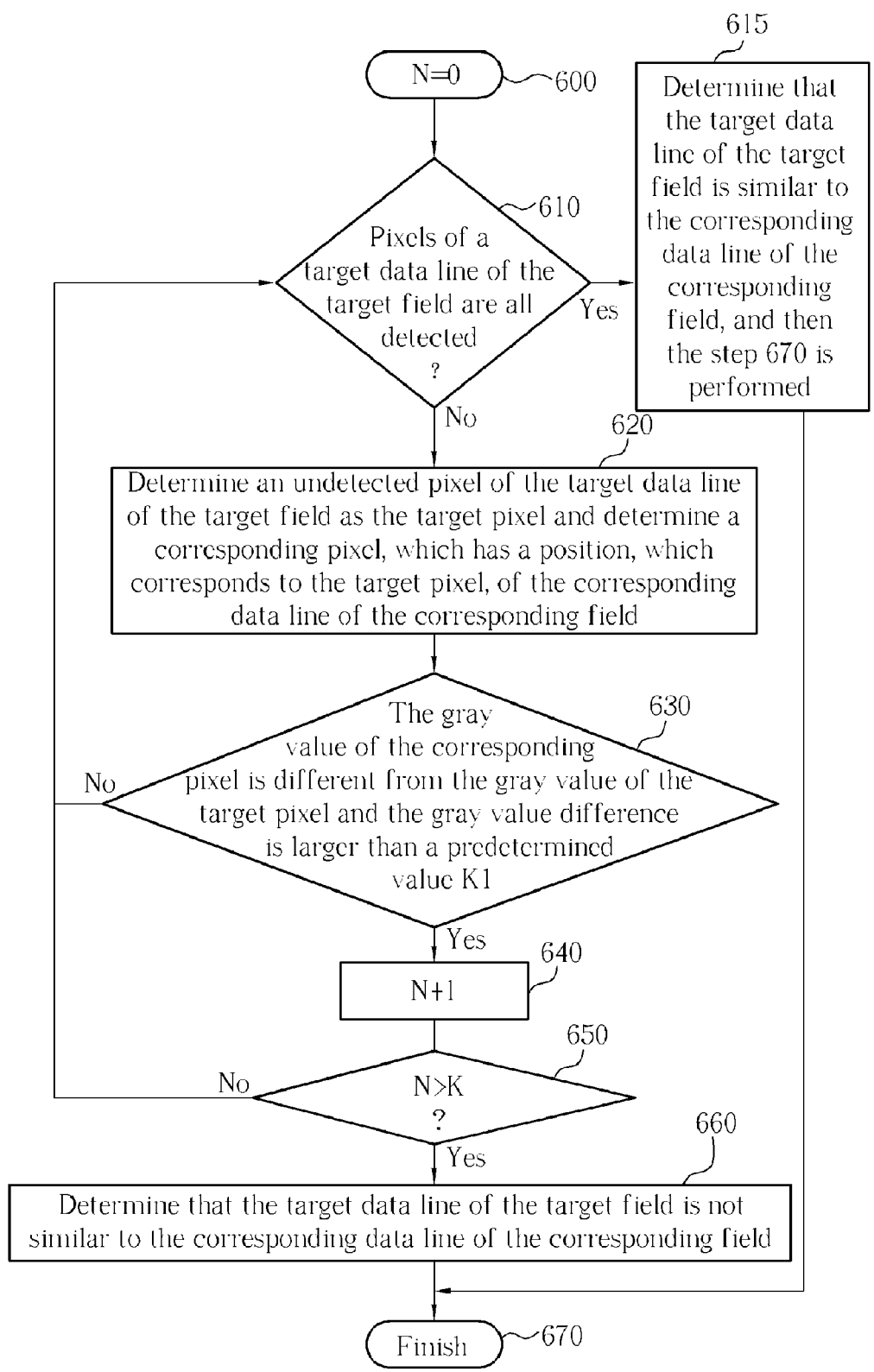
FIG. 6 is a flow chart of detecting the similarity of two data lines according to the present invention.

Please refer to FIG. 6, which is a flow chart of detecting the similarity of two data lines, wherein the field to be detected is called as a target field, and the other field is a corresponding field. And the flow chart comprises following steps:

Step 600: Set N=0;
Step 610: If all pixels of a target data line of the target field are all detected, step 615 is then performed; otherwise, step 620 is performed;
Step 615: Determine that the target data line of the target field is similar to the corresponding data line of the corresponding field, and then step 670 is performed;
Step 620: Determine an undetected pixel of the target data line of the target field as the target pixel and determine a corresponding pixel, which has a position, which corresponds to the target pixel, of the corresponding data line of the corresponding field;
Step 630: If the gray value of the corresponding pixel is different from the gray value of the target pixel, step 640 is performed; otherwise, step 610 is performed;
Step 640: Add 1 to N;
Step 650: If N is larger than the predetermined value K, then step 660 is performed; otherwise, step 610 is performed again;
Step 660: Determine that the target data line of the target field is not similar to the corresponding data line of the corresponding field;
Step 670: Finish.

In order to realize the flow of determining the similarity of two data lines, the image processing device can be embodied by software or hardware circuits.

Figure 7:
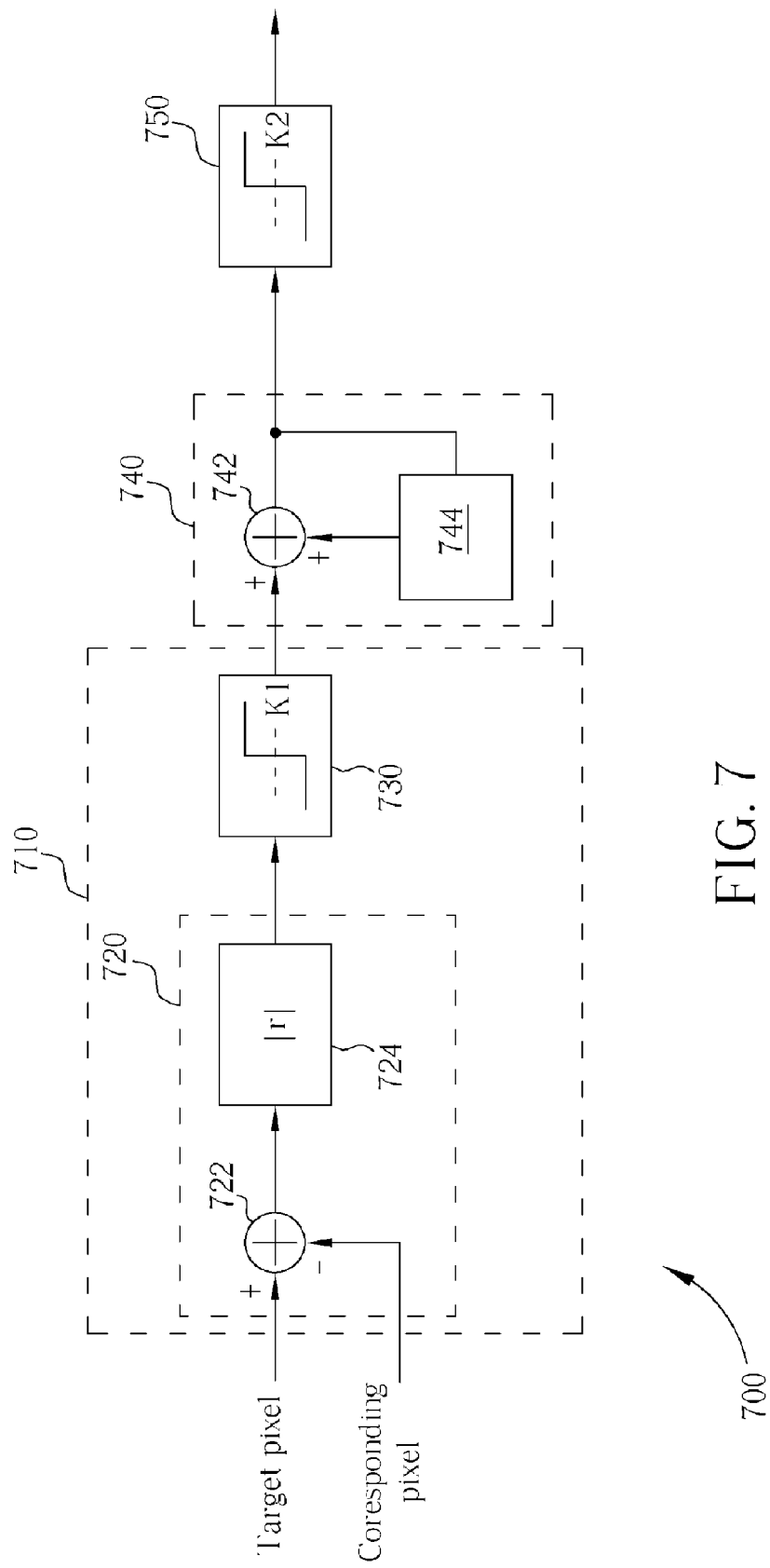
FIG. 7 is a diagram of a similarity detection device 700 of an embodiment according to the present invention.

Please refer to FIG. 7, which is a diagram of a similarity detection device 700 of an embodiment according to the present invention. The similarity detection device 700 comprises the pixel comparator 710, an adder 740, and a similarity determiner 750. The similarity detection device 700 can detect the similarities of two data lines of two odd fields or two even fields. For example, if the target pixel is the j pixel of the g data line of the target field, the corresponding pixel can be the j pixel of the g data line of the corresponding field. The pixel comparator 710 determines the gray value difference between the target pixel of the target field and the corresponding pixel of the corresponding field in order to detect whether the target pixel is similar to the corresponding pixel. The pixel comparator 710 comprises a pixel processing module 720 for calculating the absolute value of the gray value difference between the target pixel and the corresponding pixel. The pixel processing module 720 comprises a subtraction unit 722 for calculating the gray value difference between the target pixel and the corresponding pixel, and an absolute value unit 724 for outputting an absolute value of the gray value difference. In addition, the pixel comparator 710 further comprises the comparison unit 730, coupled to the absolute unit 724 of the pixel processing module 720, for comparing the gray value difference with a predetermined value K1. If the gray value difference is larger than the predetermined value K1, the comparator unit 730 outputs a value 1. On the other hand, if the gray value difference is less than the predetermined value K1, the comparison unit 730 outputs a value 0. The adder 740, coupled to the outputting end of the comparison unit 730, comprises the adder 742 and the buffer 744 for performing an adding operation on the output of the comparison unit 730. In this embodiment, if the gray value difference is larger than the predetermined value K1, the pixel comparator 710 outputs the value 1 to the adder 740. This represents that the target pixel is not similar to the corresponding pixels. Otherwise, the pixel comparator 710 outputs the value 0 to the adder 740. Therefore, if pixels of the target data line of the target field are orderly set as the target pixel, and are compared with their corresponding pixels, the pixel comparator 710 outputs the value 1 or 0 to the adder 740 according to different situations. The similarity determiner 750, coupled to the output end of the adder 740, for determining that the target data line of the target field is not similar to the corresponding data line of the corresponding field if the adding result of the adder 740 is larger than the predetermined number K2.

Figure 8:
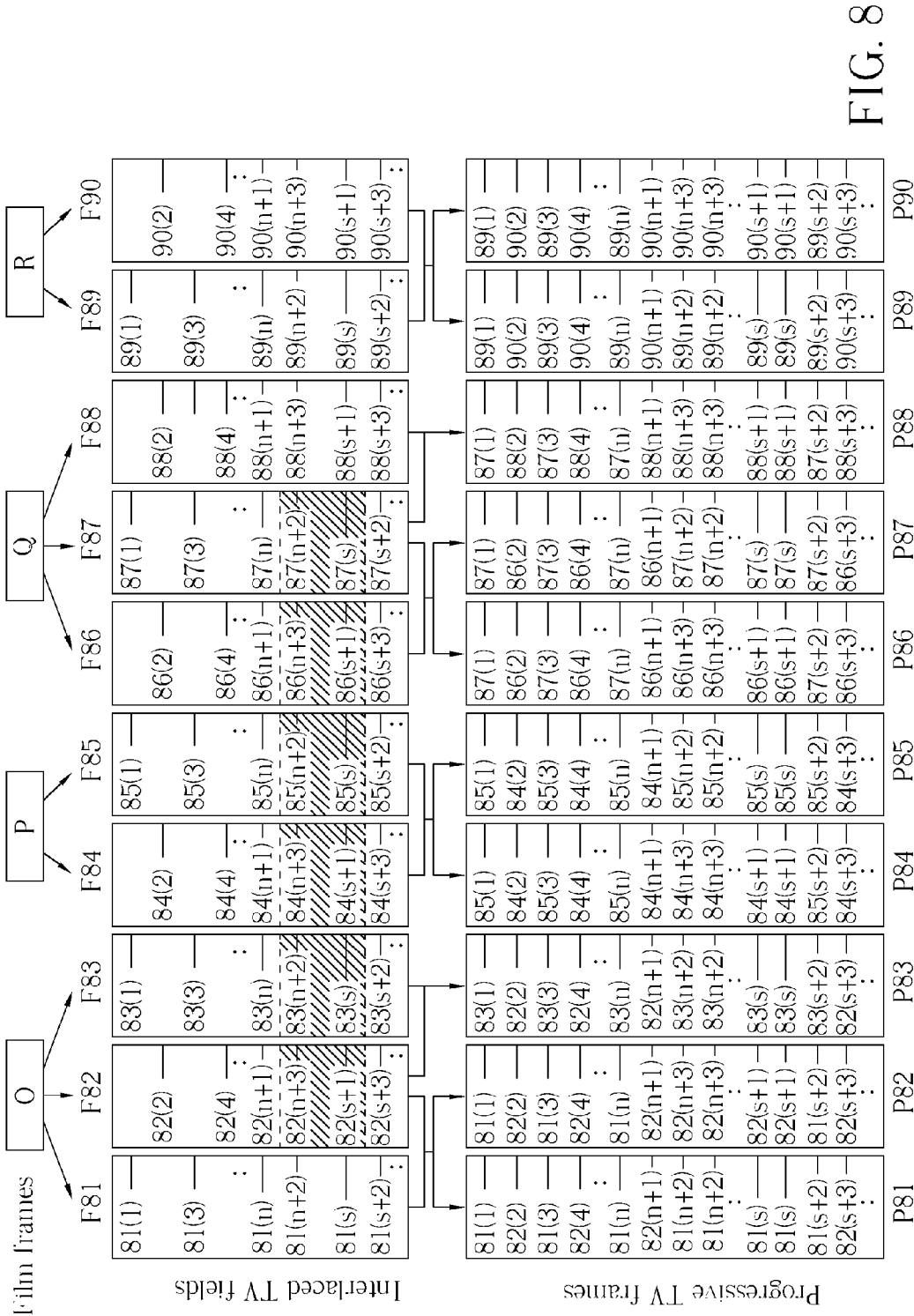
FIG. 8 is a diagram of interlaced TV fields F81-F90 comprising still texts according to the present invention.

Please note that when the interlaced TV fields comprise still texts, the present invention detects the line-based similarities in order to generate the progressive TV frames. Please refer to FIG. 8, which is a diagram of interlaced TV fields F81-F90 comprising still texts. Fields F81, F83, F85, F87, and F89 are odd fields, the others are even fields. In this embodiment, the n+2 data line to s+1 data line of the fields F82 to F87 comprises additional still texts. Please note that the range of the still texts of the odd and even field differs by one data line. For example, the n+3 data line to the s+1 data line of the field F84 comprise the still texts, the n+2 data line to the s data line of the field F85 comprise the still texts; wherein the y data line of the X field is labeled as X(y), and the area of still texts are shown as slope lines. In this embodiment, the similarity of corresponding data lines of the pair of corresponding fields of fields F81 to F90 are detected. And then the similarity is compared with a specific pattern. Because the content of odd (even) fields corresponding to the same film frame are similar, the data lines of the odd (even) fields corresponding to the same film frame are detected as being similar. In interlaced TV fields F81 to F90, the data lines from the 1 data line to n data line and the data lines after s+2 data lines of each odd fields, and the data lines from the 2 data line to n+1 data line and data lines after the s+3 data lines all comply with the specific similarity pattern. Therefore, the present invention can generate corresponding data lines of the progressive frames P81 to P90 as mentioned above. However, because the data lines from the n+2 data line to the s+1 data line further comprises still texts, when comparing the data lines from the n+2 data line to the s+1 data line of the interlaced TV fields F81 to F90, the present invention determines that the target data line of the field F86 is not similar to the corresponding data line of the corresponding field F88. In other words, the similarity pattern of the data lines from the n+2 data line to the s+1 data line cannot be detected. As mentioned above, at this time, the present invention directly utilizes data near the data line to generate the two data lines of the progressive frame instead of utilizing successive data lines.

In another embodiment, the similarity of data lines of successive odd and even fields is detect, and the progressive frames are generated according to the line-based similarity of corresponding fields. Please note that two odd and even fields originated from the same frames contains no exactly corresponding lines. Still, the line-based similarity can be determined in this embodiment. When the degree of similarity of two successive odd and even fields is larger than a predetermined value, the present invention can determine that the two fields come from the same source image. However, because the odd and even field respectively comprises odd data lines and even data lines, the odd and even fields have no directly corresponding data lines (i.e., the odd and even fields have no common data lines or common pixels). Therefore, the present invention cannot compare data lines of two odd fields or two even fields as mentioned above. In this embodiment, the present invention utilizes a zigzag detection to determine the similarity of two data lines of the two successive fields.

Figure 9:
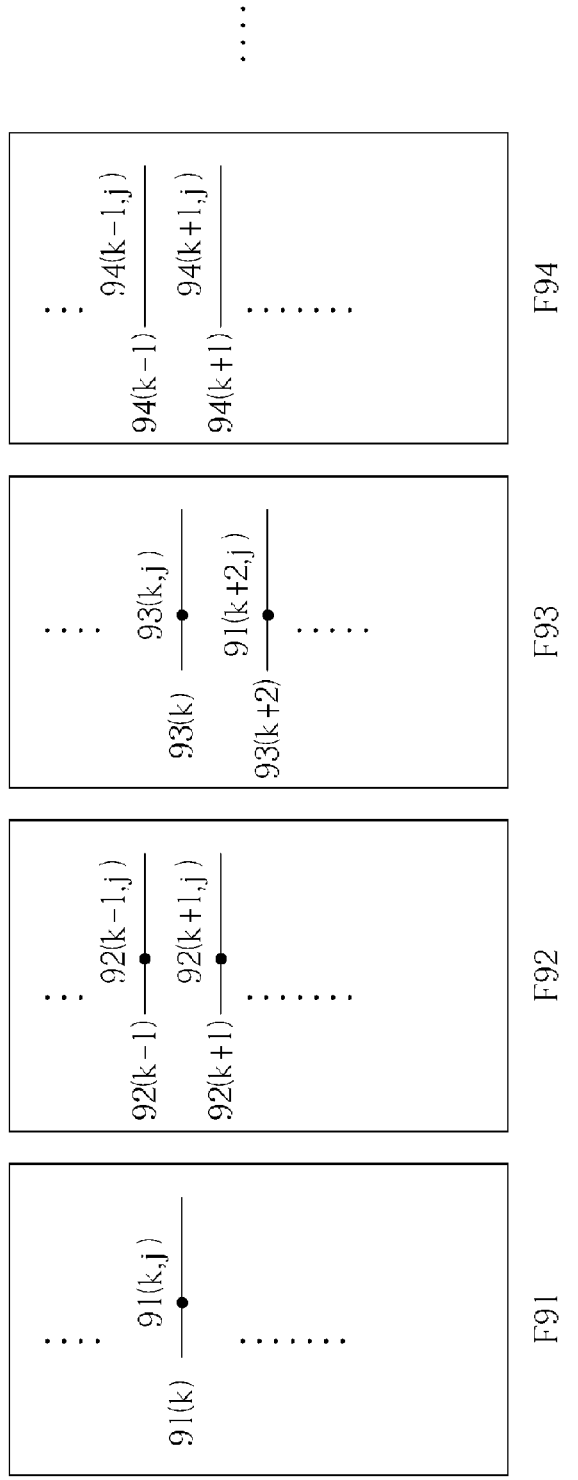
FIG. 9 is a diagram of an interlaced field sequence according to the present invention.

Please refer to FIG. 9, which is a diagram of an interlaced field sequence according to the present invention. An odd field F91, an even field F92, an odd field F93, and an even field F94 are orderly shown. In this embodiment, the gray value of each pixel of a target data line of a target field is compared with a corresponding pixel, which lies in a data line successive to the target data line, of the corresponding field; wherein the target field and the corresponding field are successive fields. Then, all of the comparison results of all pixels are summed to determine the similarity of the target data line of the target field. For example, now taking the k data line as a target data line, and the field F91 as a target field. When the pixel 91(k,j) is the target pixel, the pixel 92(k−1,j) or the pixel 92(k+1,j) are compared with the target pixel 91(k,j). In the following disclosure, 91(k,j), 92(k−1,j), and 92(k+1,j) are also utilized as the gray values of the pixels 91(k,j), 92(k−1,j), and 92(k+1,j). Please note that if the following equations are all satisfied, the present invention determines that the pixel 91(k,j) is not smooth.

$$\text{Sign}(91(k,j)-92(k-1,j)) \text{XOR Sign}(92(k+1,j)-91(k,j))=1 \quad \text{equation (1)}$$

$$Abs(91(k,j)-92(k-1,j))>K3 \quad \text{equation (2)}$$

$$Abs(92(k+1,j)-91(k,j))>K4 \quad \text{equation (3)}$$

In the above three equations, the values K3 and K4 are two predetermined values, and K3 and K4 can be the same value or different values.

In this embodiment, when the two successive fields correspond to a motion (the two fields are different because of the motion), in the area, which have pixel value variance because of the motion, of the fields, the gray value of the middle pixel is the largest or the smallest. Equation (1) is satisfied. Furthermore, the gray value difference between the middle pixel and other vertically successive pixels is larger than a predetermined value. Equations (2) and (3) are satisfied. Therefore, the present invention determines that the three pixels are not changing smoothly. Moreover, if the number of pixels, which are determined as being not changing smoothly, of the target data line of the target field are larger than a predetermined value, the present invention determines that the two data lines (e.g., the target data line and the corresponding data line) are not similar. On the contrary, if the number of pixels, which are determined as being changing smoothly, of the target data line of the target field, the present invention determines that the two data lines (e.g., the target data line and the corresponding data line) are similar.

Figure 10:
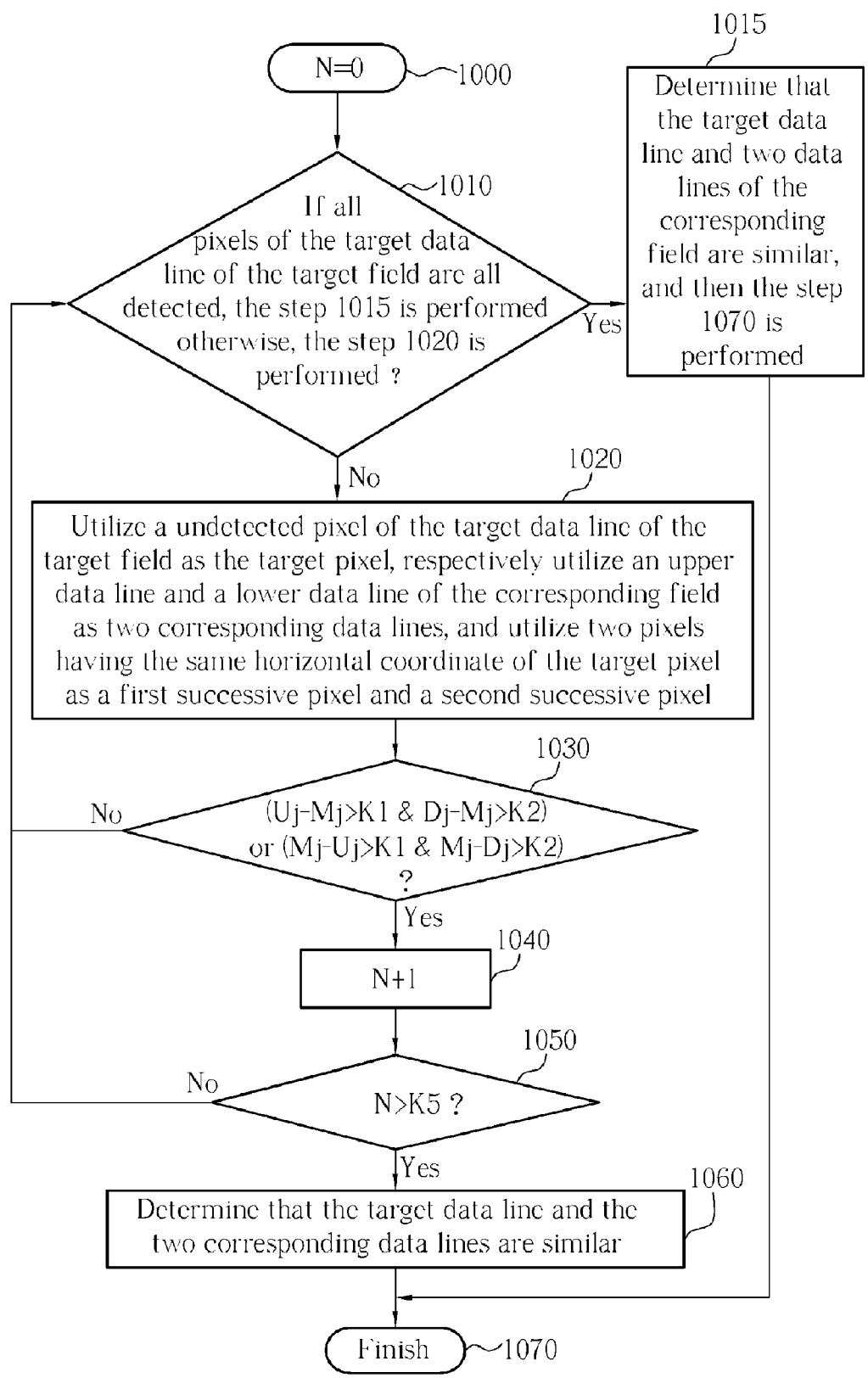
FIG. 10 is a flow chart of detecting the similarity between an odd field and an even field.

Please refer to FIG. 10, which is a flow chart of detecting the similarity between an odd field and an even field.

Step 1000: Set N as 0;

Step 1010: If all pixels of the target data line of the target field are all detected, step 1015 is performed; otherwise, step 1020 is performed;

Step 1015: Determine that the target data line and two data lines of the corresponding field are similar, and then step 1070 is performed;

Step 1020: Utilize a undetected pixel of the target data line of the target field as the target pixel, respectively utilize an upper data line and a lower data line of the corresponding field as two corresponding data lines, and utilize two pixels having the same horizontal coordinate of the target pixel as a first successive pixel and a second successive pixel;

Step 1030: If the gray value Uj of the first successive pixel is larger than the gray value Mj, the gray value difference between the gray value Uj and the gray value Mj is larger than a third predetermined value K3, or the gray value Dj of the second successive pixel is larger than the gray value Mj and the gray value difference between the gray value Dj and the gray value Mj is larger than a fourth predetermined value K4, step 1040 is performed; otherwise, step 1010 is performed;

Step 1040: Add 1 to N;

Step 1050: If N is larger than a fifth predetermined value K5, step 1060 is performed; if N is less than the predetermined value K3, step 1010 is performed;

Step 1060: Determine that the target data line and the two corresponding data lines are similar;

Step 1070: Finish.

In order to detect the similarities of the data lines of two successive odd and even fields, the image processing apparatus can be achieved by software or hardware circuits.

Figure 11:
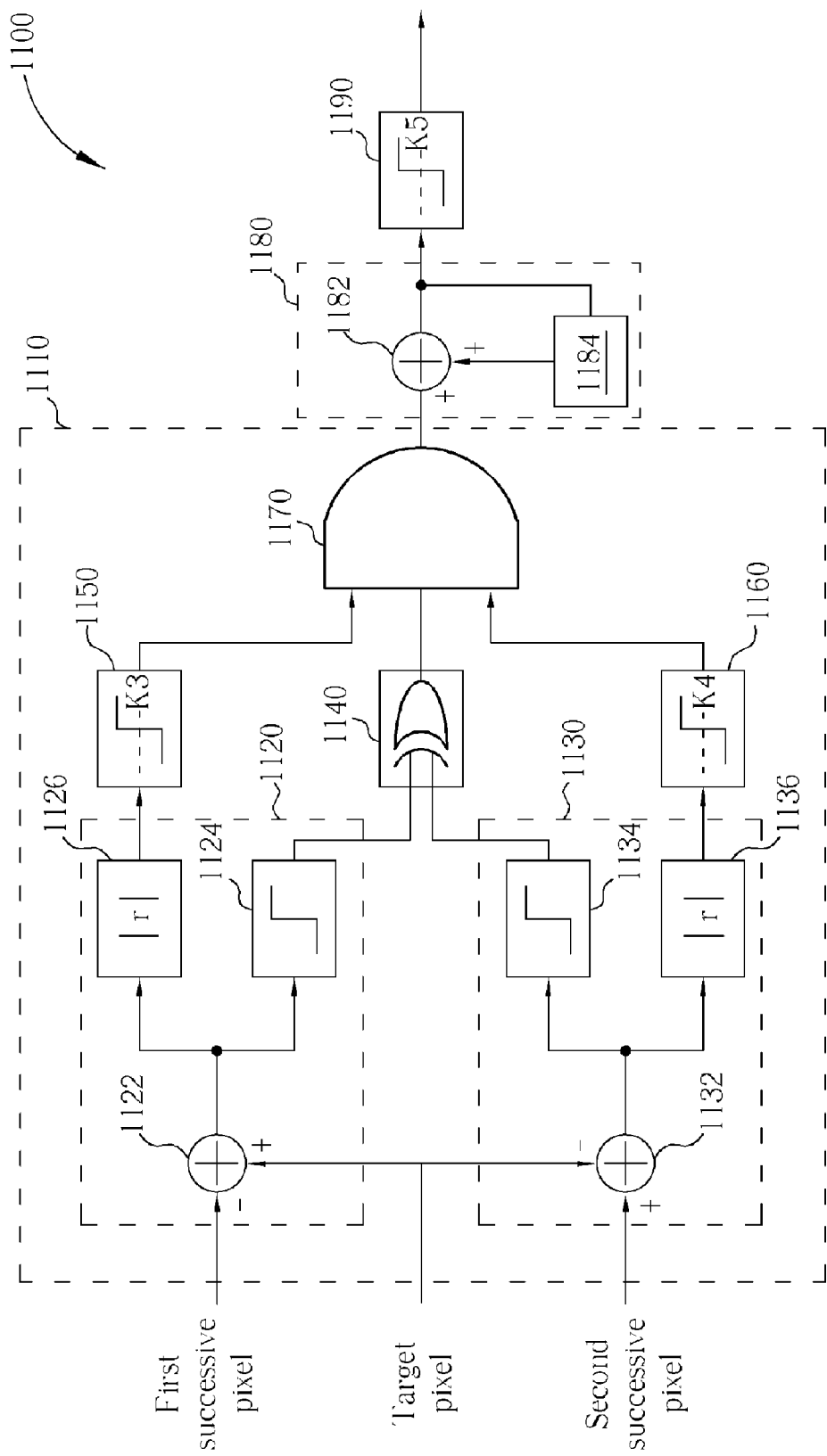
FIG. 11 is a circuit diagram of a field similarity detection device according to the present invention.

Please refer to FIG. 11, which is a circuit diagram of a field similarity detection device 1100 according to the present invention. The field similarity detection device 1100 comprises a pixel comparator 1110, an accumulator 1180, and a similarity determiner 1190. The pixel comparator 1110 compares each pixel of the target data line of the target field with two corresponding pixels of two corresponding data lines of the corresponding field to determine the similarities. In this embodiment, the field similarity detection device 1100 detects similarities of data lines of the odd and even fields. For example, when the target pixel is the m pixel of the n data line of the target field, two successive pixels can be the m pixel of the n+1 data line of the target field and the m pixel of the n−1 data line of the target pixel. The pixel comparator 1110 comprises two pixel processing modules 1120 and 1130 for calculating the gray value differences between the target pixel and two successive pixels and obtaining related information. The pixel processing module 1120 and 1130 respectively comprises a subtraction units 1122 and 1132 for calculating the gray value differences between the gray value of the target pixel and gray values of the two successive pixels. The subtraction units 1122 and 1132 respectively comprises absolute value units 1126 and 1136 for outputting the absolute values of the gray value differences, and positive/negative sign units 1124 and 1134 for outputting the sign information of the gray value. The pixel comparator 1110 further comprises a XOR gate 1140, two comparing units 1150 and 1160, and an AND gate 1170. The XOR gate 1140, coupled to the comparing units 1124 and 1134 of the two pixel processing modules 1120 and 1130, is utilized for calculating an XOR result of the sign information of the two gray value differences outputted by the two pixel processing modules 1120 and 1130. When one of the two gray value differences is positive and the other is negative, the XOR gate 1140 outputs the value 1. The comparing units 1150 and 1160, respectively coupled to the absolute value units 1126 and 1136 of the two pixel processing modules 1120 and 1130, are utilized for comparing the gray values differences between the gray value of the target pixel and the gray values of the two successive pixels with a predetermined value. In addition, if the gray value differences are respectively larger than predetermined values K3 and K4, the comparing units 1150 and 1160 output the value 1. On the other hand, if the gray value differences are respectively less than predetermined values K3 and K4, the comparing units 1150 and 1160 output the value 0. The AND gate 1170, coupled to the output ends of the two comparing units 1150 and 1160 and the output end of the XOR gate 1140, is utilized for performing a calculation on the three outputs. The accumulator 1180, coupled to the output end of the AND gate 1170, comprises an adder 1182 and a buffer 1184. The accumulator is utilized for performing an accumulating calculation on the output of the AND gate 1170. In this embodiment, if the gray value differences are both larger than the predetermined values and the gray value of the target pixel is the largest or the least among the three pixels, the pixel comparator 1110 outputs the value 1 to the accumulator 1180. This represents that the gray value of the target pixel is not changing smoothly. It is also called as a zigzag. Otherwise, the pixel comparator 1110 outputs the value 0 to the accumulator 1180. Therefore, if each pixel of the target data line of the target field is set as the target pixel, and each pixel is compared with its corresponding pixel, the pixel comparator 1110 outputs the value 1 or 0 to the accumulator 1180 according to the condition of each pixel. The similarity determiner 1190, coupled to the output end of the accumulator 1180, is utilized for determining that the target data line of the target field is not similar to the two corresponding data lines of the corresponding field if the accumulating result of the accumulator 1180 is larger than the predetermined number K5.

Figure 12:
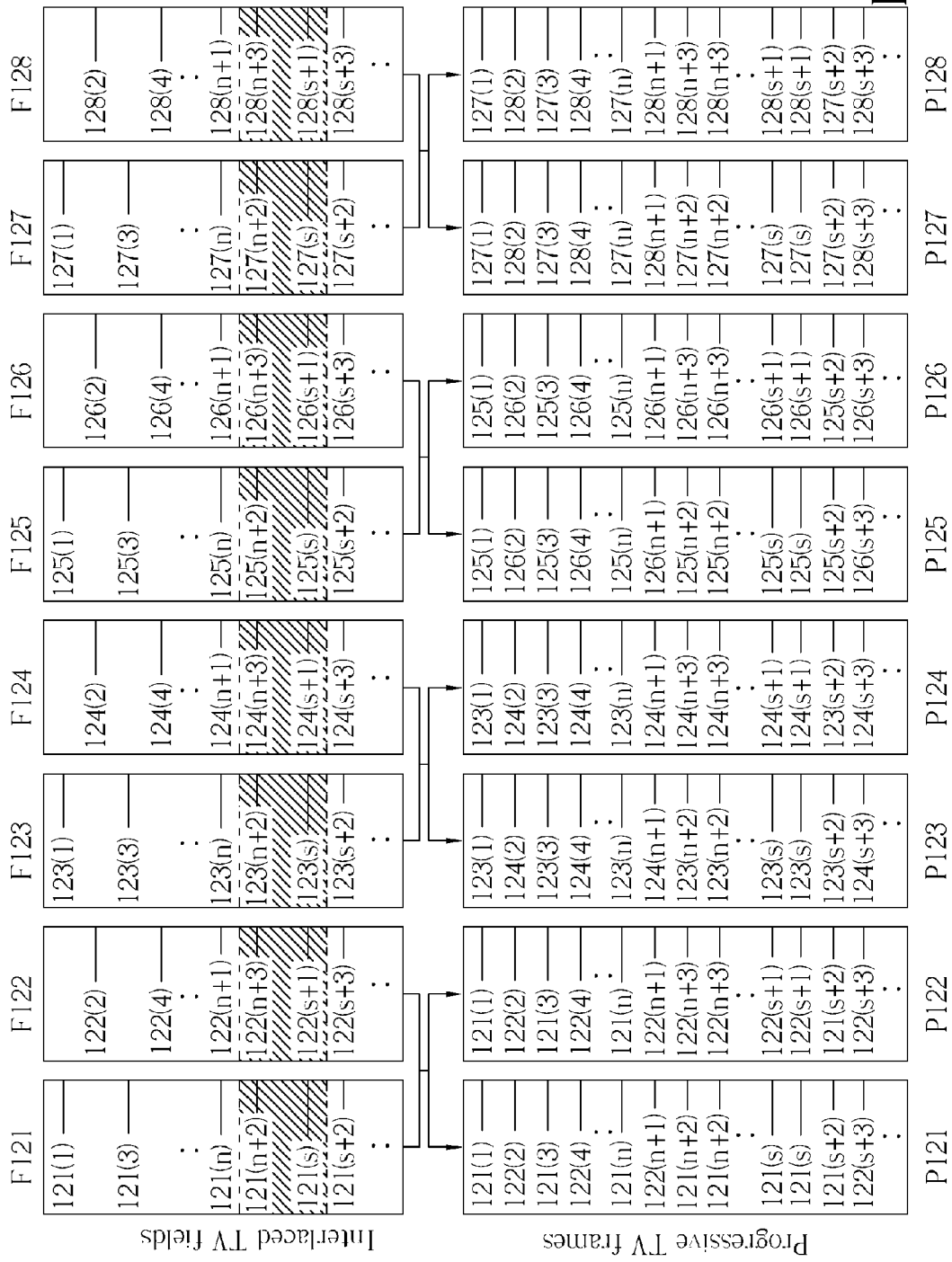
FIG. 12 shows interlaced TV fields F121-F128 generated from TV frames instead of film frames.

FIG. 12 shows interlaced TV fields F121-F128 generated from TV frames instead of film frames. Furthermore, some of the TV fields F121-F128 comprise running texts. As shown in FIG. 12, the field F121, F123, F125, and F127 are odd fields, and the field F122, F124, F126, and F128 are even fields. In this embodiment, the running text is added between the n+2 data line and the s+1 data line. Similarly, the range of the running text is shifted in one data line in the odd and even fields. It is well known that the gray values of pixels of the even and odd fields, which correspond to the same frame, changes smoothly as long as they comprises no running text. For example, the data line 121(g) of the field F121 is similar to the data line 122(g−1) and the data line 122(g+1). However, the data line 122(g+1) is not similar to the data line 123(g) and 123(g+2). In other words, if the similarities of data lines of a plurality of two successive fields are similar in interval for a predetermined number of times, then the present invention determines that the data lines are generated from a TV frame instead of the film frames. Therefore, the odd and even fields, which correspond to the same frame, can be combined to generate the progressive TV frame. As shown in FIG. 12, the data lines above the n+1 data line and below the s+2 data line of progressive frames P121-P128 are generated by combining two corresponding fields. For example, the first data line of the field F121 and the second data line of the field F122 are combined to generate the first and the second data lines of the progressive frames P121 and P122. However, when the added running text breaks the original similarity of data lines (e.g., the embodiments shown in FIG. 4 and FIG. 8), the present invention directly utilizes the data lines of the current field to generate corresponding data lines of the progressive frames.

As mentioned above, if the TV service provider adds the running text, the present invention can utilize data lines as a unit to determine the similarity of the fields. Therefore, the present invention can prevent poor display quality due to the running texts for appearing. Furthermore, the present invention can still perform the interpolation on most of pixels of the TV fields and perform the de-interlacing operation on most of the data lines of the TV fields to compensate the TV display quality. The present invention does not perform any operation on the data lines comprising the running text. This causes the running text to appear as clear rather than blurry. For example, N*1-bit line buffer can be added to a display controller. The line buffer can continuously records the similarities of all data lines of the target field. Therefore, the display controller can selectively perform the de-interlacing operation or the interpolation operation on the pixels according to the data stored in the line buffer. This allows the present invention to avoid the processing of the data lines comprising running texts. Please note that the value N is related to the display quality of the TV frame. For example, in the NTSC system, it comprises 525 data lines; the value N can be 525. In the PAL system, it comprises 625 data lines; the value N can be 625. Please note that the added hardware is limited so that the hardware cost is minimal. Moreover, because the running text is not disposed in the central position of the frames viewers may not observe the running text as much as more centrally located images. The present invention can utilize N*1-bit line buffer to utilize the data lines as a unit to determine the similarities of fields. Until the current image source does not comply with a predetermined similarity pattern, the present invention maintains the current playing mode (e.g., the film mode). Please note that the present invention device, which utilizes the data line as a unit to determine the field similarities, can operate independently or it can operate with other prior art devices that utilize entire fields to determine the field similarities.

Figure 13:
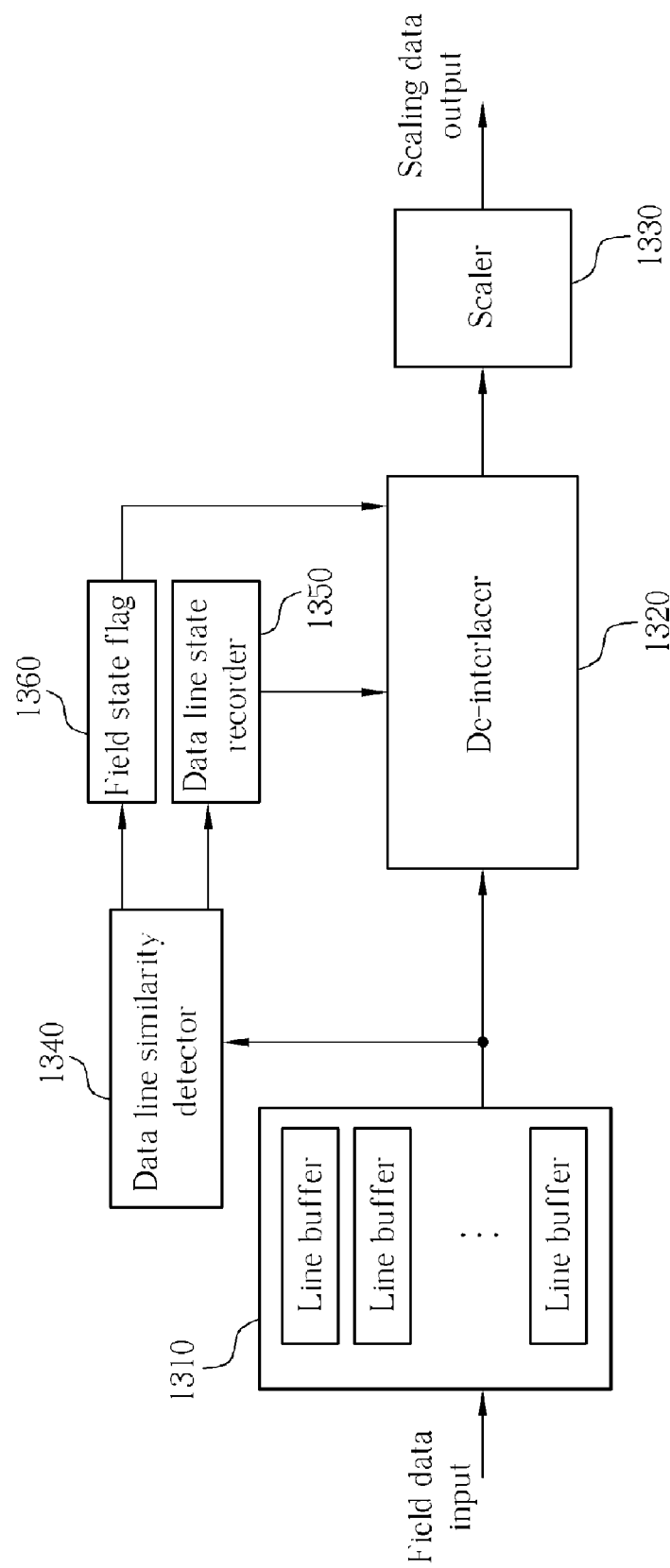
FIG. 13 is a diagram of a display controller of an embodiment according to the present invention.

Please refer to FIG. 13, which is a diagram of a display controller of an embodiment according to the present invention. The display controller comprises a buffer 1310, a de-interlacer 1320, a scaler 1330, a data line similarity detector 1340, a data line state recorder 1350, and a field state flag 1360. The buffer 1310 receives the incoming field data and stores a plurality of data lines in a plurality of inner line buffers. The de-interlacer 1320, coupled to the buffer 1310, generates a de-interlacing output. The scaler 1330, coupled to the de-interlacer 1320, generates a scaling output. The data line similarity detector 1340, coupled to the buffer 1310, detects the similarities of all data lines of the field and storing the similarities in the data line state recorder 1350. Preferably, the data line state recorder 1350 contains an N*1 line buffer, as mentioned above, wherein N associates with the display resolution (e.g., N is 525 in the NTSC system or N is 625 in the PAL system). Additionally, the data line similarity detector 1340 determines the field state of the target field and stores the state in the field state flag 1360. The field state flag 1360 comprises three flag bits, which respectively represents three states of the running text, the still text, and the bad editing. These flag bits can be referenced by the de-interlacer 1320. Alternatively, if the data line similarity detector 1340 also determines the correct mode (e.g., film mode or TV mode) of the target field, the data line state recorder 1350 can be 525*5 bits in the NTSC system for storing the similarities of 525 data lines at five successive time points. Please note that data line state recorder 1350 can be 625*5 bits in the PAL system. Therefore, the de-interlacer 1320 can selectively de-interlace the data according to the data line state recorder 1350. Then the scaler 1330 can perform a scaling operation on the processed data. These operations still stays the correct mode although the running text destroys the original display structure of the pixels. For example, the target field comprises a main image area without running text, and a secondary image area with, for example, the running text. For example, if the running text lies in the lower position of the frame, the de-interlacer 1320 and the scaler 1330 can perform the de-interlacing and scaling operation on the main area of the target field and the successive field according to the data line state recorder 1350. If the target field is an odd field, then the successive field is an even field. Alternatively, if the target field is an even field, then the successive field is an even field. The secondary area is not interlaced with an adjacent field because that will make it worse. Preferably, the target field is interpolated and scaled by itself.

Figure 14:
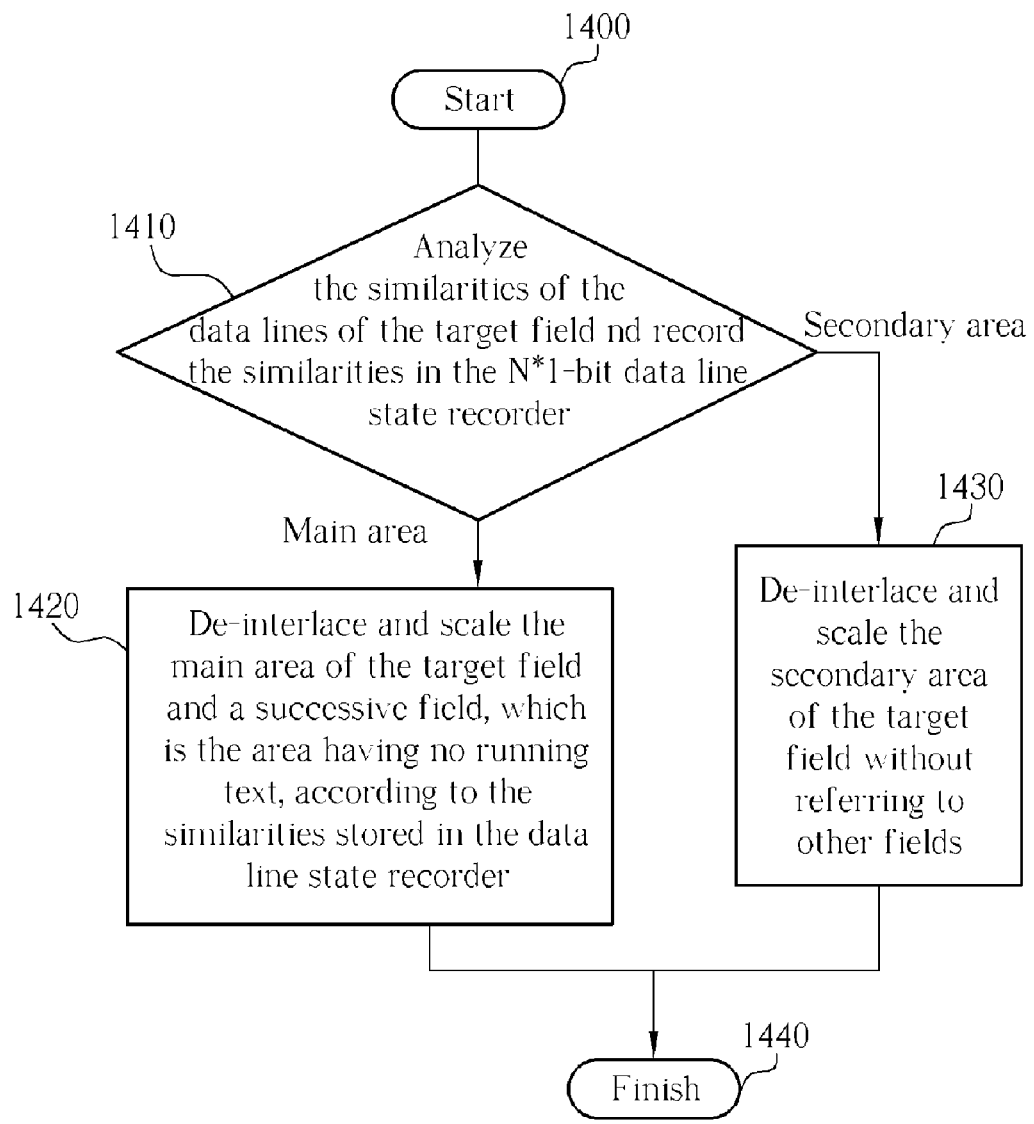
FIG. 14 is a flow chart of selectively performing the de-interlacing operation and the scaling operation according to detected similarities.

Please refer to FIG. 14, which is a flow chart of selectively performing the de-interlacing operation and the scaling operation according to detected similarities. The flow is illustrated as follows.

Step 1400: Start;

Step 1410: Analyze the similarities of the data lines of the target field and record the similarities in the N*1-bit data line state recorder;

Step 1420: De-interlace and scale the main area of the target field with a successive field, which is the area having no running text, according to the similarities stored in the data line state recorder;

Step 1430: De-interlace and scale the secondary areas of the target field without referring to other fields. This allows the running text clearer;

Step 1440: Finish.

In summary, the present invention provides a method of utilizing a data line as a unit to generate progressive TV frames according to interlaced TV fields and apparatus thereof. The present invention can more elastically generate the progressive TV frames. Even when a running text is added to the field, the present invention can process other areas that do not contain any running texts. In addition, the present invention can prevent poor editing of the fields due to the interlaced TV fields being derived from film data.

The present invention can first utilize a whole field as a unit to detect whether the similarity pattern exist in order to ensure what the data source of the interlaced TV fields is. And then the present invention utilizes the data line as a unit to detect the similarity so that the present invention can generate a high-quality progressive TV frames. Furthermore, the present invention can detect whether the similarity complies with a predetermined similarity pattern. If the number of the similarities of the data lines of the target field is larger than a predetermined number, the present invention directly utilizes the target field to generate the progressive TV frames.

The present invention also provides a data line similarity detecting device and related methods thereof. The present invention can utilize two fields, which have one field between them, or two successive fields to perform the similarity detection. Of course, the present invention also utilizes one data line as a unit. The present invention similarity detecting device comprises a pixel comparator for comparing the gray values between the target pixel and a corresponding pixel; an accumulator, coupled to the pixel comparator, for accumulating the comparison results outputted by the pixel comparator; and a similarity determiner, coupled to the accumulator, for determining the similarity of the data lines of the target field.

Please note that the present invention data line similarity detecting device shown in FIG. 7 and FIG. 11 is only utilized as an preferred embodiment, not a limitation. In other words, any other usable hardware circuits or software method having this function all obey the spirit of the present invention.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A display controller capable of detecting data line similarity comprising:
   a buffer for temporarily storing a plurality of data lines of a target field;
   a data line similarity detector, coupled to the buffer, for detecting a similarity of each data line of the target field;
   a data line state recorder for recording the similarity of each data line of the target field;
   a de-interlacer directly coupled to the buffer and directly coupled to the data line state recorder; and
   a scaler coupled to the de-interlacer;
   wherein the de-interlacer selectively de-interlaces the target field line by line according to the content stored in the data line state recorder in order to generate a de-interlaced output, and the scaler generates a scaling output according to the de-interlaced output.

2. The display controller of claim 1, wherein the data line state recorder is 525*5 bits.

3. The display controller of claim 1, wherein the data line state recorder is 625*5 bits.

4. The display controller of claim 1 further comprising a field state flag modified by the data line similarity detector for storing a field state of the target field, wherein the field state flag comprises three flag bits including a running text flag bit, a still text flag bit, and an image bad editing flag bit for respectively representing a state of a running text, a state of a still text, and a state of an image bad editing.

5. A display controller capable of detecting data line similarity comprising:
   a buffer for temporarily storing a plurality of data lines of a target field;
   a data line similarity detector, coupled to the buffer, for detecting a similarity of each data line of the target field, wherein the data line similarity detector comprises:
      a first comparator for comparing a target pixel of a target data line of the target field with a first corresponding pixel of a first corresponding data line of a successive field to generate a first comparison result;
      a second comparator for comparing the target pixel of the target data line of the target field with a second corresponding pixel of a second corresponding data line of the successive field to generate a second comparison result;
      an accumulator for performing an accumulating calculation when gray level differences between the target pixel and the first corresponding pixel and between the target pixel and the second corresponding pixel are both greater than predetermined values and when a gray level of the target pixel is the largest or the least among the target pixel, the first corresponding pixel, and the second corresponding pixel; and
      a similarity determiner coupled to an output end of the accumulator, for determining that the target data line of the target field is not similar to the first corresponding data line and the second corresponding data line when an accumulating result of the accumulator is larger than a predetermined number;
   a data line state recorder for recording the similarity of each data line of the target field;
   a de-interlacer coupled to the buffer; and
   a scaler coupled to the de-interlacer;
   wherein the de-interlacer selectively de-interlaces the target field line by line according to the content stored in the data line state recorder in order to generate a de-interlaced output, and the scaler generates a scaling output according to the de-interlaced output.

* * * * *